No. 665,060. Patented Jan. 1, 1901.
C. BUSKY.
PEA HARVESTER.
(Application filed May 19, 1900.)
(No Model.) 2 Sheets—Sheet 1.
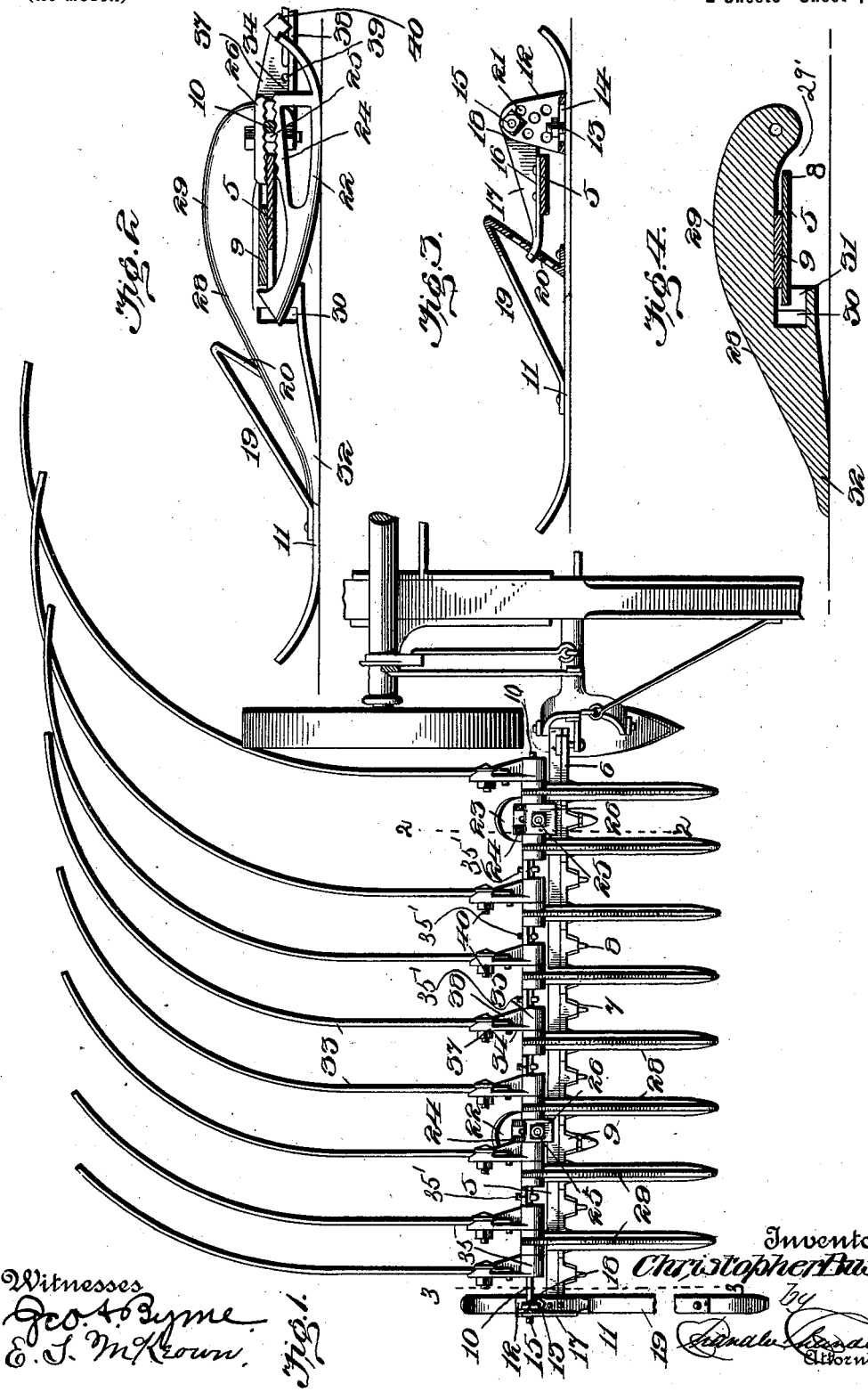

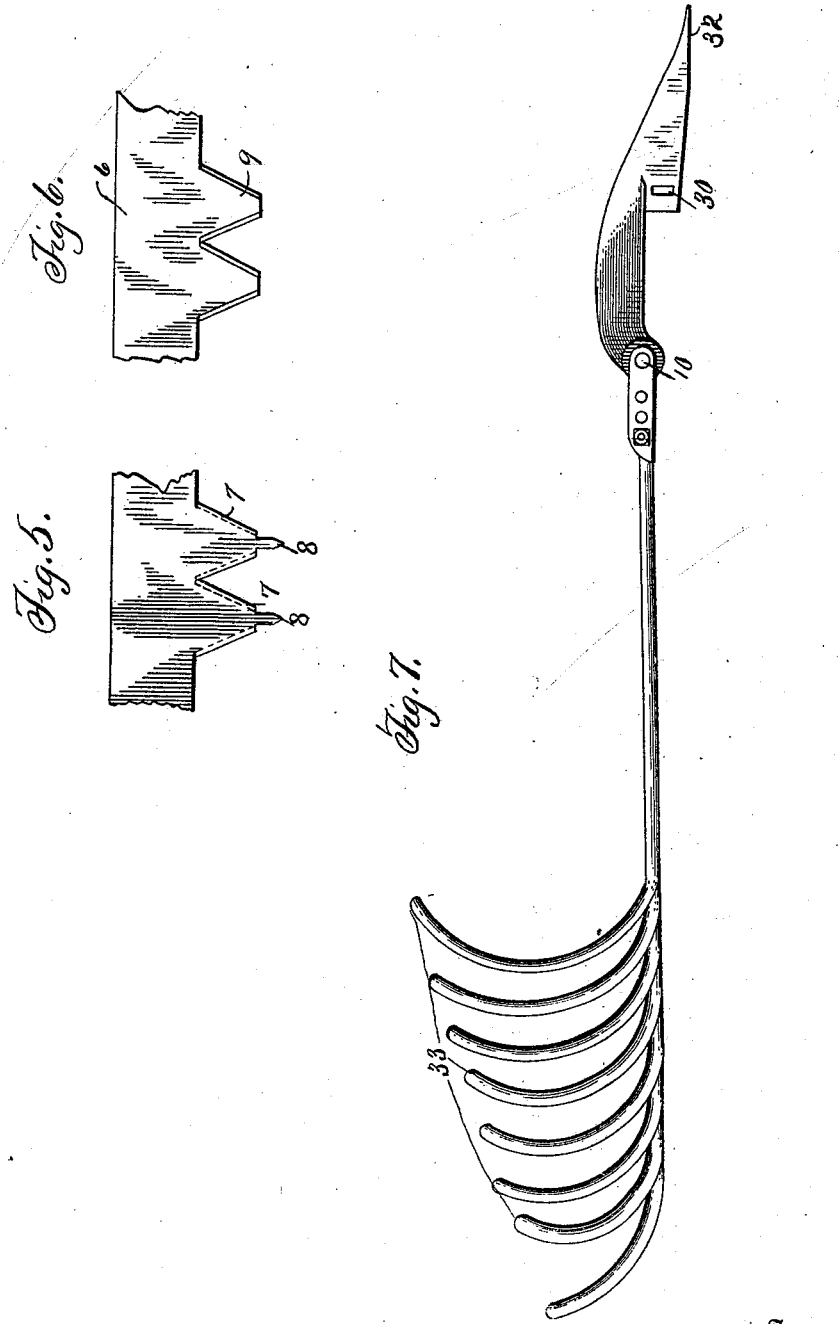

UNITED STATES PATENT OFFICE.

CHRISTOPHER BUSKY, OF PRAIRIE DU CHIEN, WISCONSIN.

PEA-HARVESTER.

SPECIFICATION forming part of Letters Patent No. 665,060, dated January 1, 1901.

Application filed May 19, 1900. Serial No. 17,225. (No model.)

*To all whom it may concern:*

Be it known that I, CHRISTOPHER BUSKY, a citizen of the United States, residing at Prairie du Chien, in the county of Crawford, State of Wisconsin, have invented certain new and useful Improvements in Pea-Harvesters; and I do hereby declare the following to be a full, clear, and exact description of the invention, such as will enable others skilled in the art to which it appertains to make and use the same.

This invention relates to harvesters in general, and more particularly to pea-harvesters, although it will be seen from the following description that the principles involved may be applied to harvesters for other purposes.

One object of the invention is to provide a construction in which the peas or other crop will be raised from the ground to permit access of the sickle thereto and to separate the swath from the standing crop and to deliver the cut crop at the outer side of the swath, so as not to be trampled upon by the horses during the succeeding cut.

Further objects and advantages of the invention will be apparent from the following description.

In the drawings forming a portion of this specification, and in which like numerals of reference indicate similar parts in the several views, Figure 1 is a plan view showing the complete machine. Fig. 2 is a section on line 2 2 of Fig. 1. Fig. 3 is a section on line 3 3 of Fig. 1. Fig. 4 is a detail longitudinal section of one of the guards. Fig. 5 is a plan view showing a portion of the fixed cutter-bar. Fig. 6 is a plan view showing a portion of the movable sickle. Fig. 7 is a side elevation showing the curves of the different delivery-rods, the attaching-rod with the delivery-rods being detached from the remainder of the machine.

Referring now to the drawings, the cutting mechanism comprises a fixed cutter-bar 5, which takes the place of the usual finger-bar, but is provided with teeth 7 at its front edge instead of the usual fingers. The teeth 7 are sharpened at their edges, as shown, and their forward ends are reduced in width to form minor terminals 8. Upon the cutter-bar 5 is slidably disposed a sickle 6, having teeth 9, which lie upon the teeth 7 and beyond which the reduced portions 8 project, as shown in Fig. 1 of the drawings. The bar 5 is hinged to the usual main frame, as shown, while the sickle 6 has the usual reciprocating mechanism. The outer end of the bar 5 is supported by a shoe 11. This shoe 11 has a block 12 mounted thereon and held adjustably upon the shoe by means of a bolt 13, which is engaged with a slot 14 in the foot of the block and with the shoe, and the upper end of the block is perforated to receive the bolt 15, which holds the outer end of the fixed cutter-bar 5 to the block. The bolt is not engaged directly with the fixed cutter-bar 5, but with a plate 16, which is riveted upon the upper face of the fixed cutter-bar 5 and has an upwardly-directed flange 17, having a rearward extension 18, through which the bolt 15 is passed. The shoe 11 extends from a point in the rear of the cutter-bar, under and beyond the front edge of said bar, the forward and rear ends thereof being bent upwardly. From a point between the forward end of the shoe and the cutter-bar there extends upwardly and rearwardly a plate 19, which is then bent downwardly and forwardly, as shown at 20, and is attached to the shoe. This downwardly-extending portion 20 is provided with perforations, whereby the forward pointed end of plate 16 may be engaged with the proper one of these perforations to secure the desired elevation of the cutter-bar at its outer end. The elevation of the rear end of plate 16 is varied by engaging the bolt 15 with any one of the perforations 21 in the block 12.

In order to support the fixed cutter-bar at points between its ends, shoes 22 and 23 are provided, each of these shoes being of the usual form on its under side, and these shoes are held to the fixed cutter-bar and attaching-rod 10, hereinafter described, in proper relation thereto through the medium of a common clamp. This clamp consists of a table 24, formed upon the upper face of the shoe and having a longitudinal slot through which is passed in an upward direction a clamping-bolt 25. The upper face of the table 25 acts as one clamping face or jaw and is serrated to secure an efficient grip, and cooperating with this clamping-jaw is a movable plate 26, having a longitudinal slot in which the clamping-bolt is engaged. The clamping-jaws thus formed receive both the rod 10 and the fixed cutter-bar between them, and by screwing up on the clamping-bolt the shoe is clamped to the cutter-bar 5 and the attaching-rod is held securely to the bar 5 and the shoe.

In order to raise the pea-vines so that the cutters may pass under them, and thus cut them close to the ground, guards 28 are formed for the teeth 8 of the cutter-bar, and each of these guards consists of a vertical web portion 29, having a slot 29' in its under side and adjacent its rear end, and which slot or recess receives the tooth of the cutter-bar, with sufficient space above the cutter-bar to permit operation of the sickle. In the front wall of the recess 29' of each guard 28 is formed a recess 30, which opens into a transverse slot 31, and in these supplemental recesses are received the extremities of the fingers of the cutter-bar, said extremities projecting into the transverse slots 31. The rear ends of the guards are pivotally mounted on the rod 10, and at their front ends are provided shoes 32, which run on the ground and support the guards.

Between the guards and mounted pivotally on the rod 10 are delivery-rods 33, which extend rearwardly and upwardly, the outermost rod being at a greater elevation at its free end than the adjacent rod and lying with a greater slant, the slant and altitudes of the rods diminishing as they approach the inner end of the cutter-bar. The inner ends of these rods 33 are attached to the rod 10 through the medium of clamps, each comprising a plate 34, having a hub portion 35, which is perforated to receive the rod 10, and a rearwardly-extending portion comprising a vertical web 37 and a horizontal flange 38. The web 37 has a plurality of perforations 39 therein, and the inner ends of the rods 33 are turned laterally for interchangeable engagement with these perforations and are held therein by means of bolts 40, which are engaged with perforations in the webs 37 and have enlarged heads which bear against the delivery-rods to clamp them in position. The hubs 35 are held spaced by hook-bolts 35', which are engaged over the rod 10 between the hubs.

The operation of the harvester is as follows: The machine is driven in the usual manner up to the standing crop and the finger-guards pass under the vines and raise them, so that the knives may be engaged with the vines close to the ground. The cut vines pass over the guards and onto the delivery-rods, where they are rolled over and over and gradually moved in the direction of the ground-wheels of the machine—that is, away from the standing crop—and are finally discharged at the outer side or edge of the swath.

The positions of the discharge or conveyer rods may be varied by changing the ends thereof in the perforations of their attaching-plates, and the elevation of the machine to conform to even or uneven ground may be accomplished in the manner hereinbefore described.

Having thus described my invention, what I claim, and desire to secure by Letters Patent, is—

1. In a pea-harvester, the combination with a main frame having driving mechanism, of a cutter-bar hinged to the frame, a shoe connected with the outer end of the cutter-bar and with respect to which the cutter-bar is adjustable vertically to raise and lower the bar, a reciprocatory sickle mounted on the cutter-bar and operatively connected with said driving mechanism, an attaching-bar in the rear of the cutter-bar, fingers carried by the attaching-bar and extending forwardly of the cutter-bar, shoes disposed beneath the cutter-bar, and clamping members carried by said shoes and engaged with the cutter-bar and attaching-rod, to hold the shoes, the rod and the bar in coöperative relation.

2. In a pea-harvester, the combination with a main frame and driving mechanism thereon, of a cutter-bar hinged to the frame, an attaching-bar in the rear of the cutter-bar, shoes disposed beneath the cutter-bar, clamps carried by the shoes and engaged with the cutter-bar and attaching-rod for holding them in coöperative relation, fingers mounted upon the attaching-bar and projecting over and forwardly of the cutter-bar, plates pivotally mounted upon the attaching-rod and alternating with the fingers and delivery-rods adjustably connected with the plates and extending rearwardly therefrom.

3. In a pea-harvester, the combination with a main frame, of a cutter-bar hinged thereto and carrying cutting mechanism, and a shoe for the outer end of the cutter-bar, said shoe comprising a runner, an angle-plate upon the runner and having perforations therein, said plate being adjustable longitudinally of the runner, and an angle-iron extending upwardly and rearwardly from the runner and having perforations therein, and a plate attached to the outer end of the cutter-bar, said plate having a projection to enter the perforations of the angle-iron and having a perforation through which is passed a bolt for engagement with the perforations of the angle-plate interchangeably, whereby the cutter-bar may be supported at different elevations.

In testimony whereof I affix my signature in the presence of two witnesses.

CHRISTOPHER BUSKY.

Witnesses:
L. F. S. VIELE,
A. H. LONG.